United States Patent [19]

Girovich et al.

[11] Patent Number: 5,259,977
[45] Date of Patent: Nov. 9, 1993

[54] METHOD AND APPARATUS FOR THE TREATMENT OF SEWAGE SLUDGE AND THE LIKE

[75] Inventors: Mark Girovich, Baltimore; Jerome F. Dausman, Brookeville, both of Md.

[73] Assignee: Bio Gro Systems, Inc., Annapolis, Md.

[21] Appl. No.: 854,896

[22] Filed: Mar. 20, 1992

[51] Int. Cl.⁵ ........................ B01D 37/00; B01D 35/18
[52] U.S. Cl. ........................... 210/770; 210/751; 210/768; 210/764; 210/774; 210/195.1; 210/181
[58] Field of Search ............... 210/770, 751, 769, 609, 210/768, 774, 764, 195.1, 181, 761

[56] References Cited

U.S. PATENT DOCUMENTS

| | | | |
|---|---|---|---|
| 3,941,357 | 3/1976 | Wurtz | 366/91 |
| 3,963,471 | 6/1976 | Hampton | 210/770 |
| 4,270,279 | 6/1981 | Roediger | 210/609 |
| 4,306,978 | 12/1981 | Wurtz | 210/750 |
| 4,744,829 | 5/1988 | Eirich et al. | 210/751 |
| 4,781,842 | 11/1988 | Nicholson | 210/751 |
| 4,872,998 | 10/1989 | Dausman et al. | 210/770 |
| 4,902,431 | 2/1990 | Nicholson et al. | 210/751 |
| 4,956,926 | 9/1990 | Glorioso | 34/11 |
| 4,983,296 | 1/1991 | McMahon et al. | 210/769 |
| 5,069,801 | 12/1991 | Girovich | 210/770 |

Primary Examiner—Robert A. Dawson
Assistant Examiner—Ana M. Fortuna
Attorney, Agent, or Firm—Sixbey, Friedman, Leedom & Ferguson

[57] ABSTRACT

A process for the production of a durable granular or pelletized sludge product is disclosed whereby a minimal amount of high calcium oxide material is utilized for pathogenic stabilization, the resulting material being further processed through an agglomeration stage. A portion of the agglomerated material is further processed in a moisture reduction or drying stage and recycled back to the agglomeration stage for percent solids adjustment and promotion of agglomeration. An apparatus for performing the process is also disclosed.

11 Claims, 1 Drawing Sheet

METHOD AND APPARATUS FOR THE TREATMENT OF SEWAGE SLUDGE AND THE LIKE

TECHNICAL FIELD

The present invention relates to a waste treatment process and apparatus for the production of a pathogen free, uniform, durable granular end-product from sewage sludges and similar wastes. Particularly, the present invention relates to a process and apparatus for treating the dewatered sludge by utilizing a combination of chemical, thermal, physical and mechanical treatment to disinfect the sludge, to control offensive odors, to condition the sludge for easier storage, handling and application, and to produce an end product compatible with and desirable for use in agriculture as a soil conditioner or fertilizer.

BACKGROUND ART

The use of quicklime and similar alkaline materials for sanitation has a long history. The Roman army was known to spread quicklime in their latrines. In the last century, with the development of modern sewage systems, the use of lime products for flocculation of solids in raw sewage or liquid sludges has been developed. The role of alkaline materials in pH adjustment and the beneficial effect of pH in pathogen reduction is a more recent development, having occurred in only the last 60 years. The end result of research into pathogen reduction in wastewater treatment has prompted the U.S. Environmental Protection Agency to promulgate regulations specifying environmentally sound treatment criteria. More specifically, the EPA's "Process Design Manual for Sludge Treatment and Disposal" outlines methods for achieving pathogen reduction through pH adjustment using lime or other alkaline materials.

The EPA regulations outline two levels of pathogen reduction; the first being a Process to Significantly Reduce Pathogens (PSRP treatment), and a second higher level of pathogen inactivation or Process to Further Reduce Pathogens (PFRP treatment). Disposal or agricultural reuse of sludges processed under a PSRP treatment are still highly regulated because unwanted pathogenic activity can still occur in the end-product. From a marketing standpoint PFRP treatment is more desirable. A PFRP end-product is virtually pathogen free and unsuitable for regrowth of undesirable organisms, consequently the regulatory focus is on the process itself, not multiple end-use land application sites.

In the EPA's design manual the lime or alkaline processes described achieve a PSRP level of stabilization, through only pH adjustment. Not all pathogens can be inactivated through pH adjustment. Parasite ova, such as hookworm or Ascaris are known to survive for long periods of time in high pH conditions, consequently an alternative method of inactivation must be used to kill parasites. The EPA design manual states in part that with such a method:

> Direct addition of dry quicklime to sludge and without the use of a separate slaker, is practiced in Denmark [and]in at least ten Swedish treatment plants. Potential advantages are the elimination of slaking equipment and the generation of heat, which can improve pathogen reduction and speed dewatering through evaporation. In one case, direct additions of dry quicklime were made to raise sludge pH above 13.0 and bring the temperature to 175° F (80° C). Salmonella and intestinal parasites were killed within two hours. Heat generated by slaking of quicklime does not raise temperature significantly unless the sludge is dewatered and the lime dose is high—on the order of 400 to 800 pounds per ton dry solids (200-400 kg/t).

The recent history of advanced alkaline stabilization processes to produce a PFRP end-product stem from these early European efforts.

A majority of research in this field involves the pathogenic stabilization of sludge through pH adjustment and heat generated from the exothermic reaction of quicklime with water. U.S. Pat. No. 4,270,279 issued to Roediger and U.S. Pat. No. 4,306,978 issued to Wurtz disclose methods utilizing such research. U.S. Pat. No. 4,270,279 discloses the gentle handling of partially dewatered sludge cake and dusting only the surfaces of sludge particles thus resulting in a granular product; however, this process can only be carried out using partially dewatered sludge cake in sheet form prepared by belt filter presses.

U.S. Pat. No. 4,306,978 discloses a process which utilizes dewatered sludge cake from any source, however a high dose of quicklime is necessary in carrying out the process. The thorough mixing of the quicklime in this process, as compared to only surface dusting in the Roediger process, is a major reason for the increased quicklime usage in this process. In actual tests using the same type sludge blender as described in U.S. Pat. No. 4,306,978, that being the blender described in U.S. Pat. No. 3,941,357, it was found that 25 percent more quicklime was required to produce a granular product than is needed to meet EPA PFRP pH and temperature standards.

Granularization or pelletization of sludges has been taught in a number of disclosures such as U.S. Pat. No. 3,963,471 issued to Hampton, U.S. Pat. No. 4,956,926 issued to Glorioso, and U.S. Pat. No. 5,069,801 issued to Girovich. Each of these patents teach the recycling of a portion of the pelletized end-product to promote further drying and pelletization. The drawback to each of these systems is that all of the recycle material must be reheated. A finished product cannot be drawn off directly after the recycle mixing.

Accordingly, there is clearly a need for a process and apparatus which can meet the ERA PFRP ph and temperature standards while minimizing the amount of quicklime necessary in carrying out the process. Moreover, there is a need for a process and apparatus which efficiently and effectively achieves a virtually pathogen free end-product which is unsuitable for the regrowth of undesirable organisms. Furthermore, there is a need to minimize dust and pasteous end product and to produce a durable granular or pelletized sludge product for use as a soil amendment or fertilizer through a more energy efficient granulation or pelletization method.

SUMMARY OF THE INVENTION

It is a primary object of the present invention to provide a process which overcomes the shortcomings associated with the aforementioned prior art processes.

Another object of the present invention is to provide a novel process for the reduction of quicklime or other suitable material required for the production of a granular pathogenically stabilized sludge product.

It is a further object of the present invention to provide a process and apparatus for accepting any type of dewatered sludge cake produced in any manner for processing into a granular pathogenically stabilized sludge product.

It is another object of the present invention to utilize a portion of the end product in a recycle loop back to an agglomeration stage, such recycle step involving moisture reduction in order to enhance pellet agglomeration.

These, as well as further objects of the present invention, are attained by reacting the sludge and quicklime together in a blending stage which attains pathogenic stabilization through pH and temperature adjustment, then passing the paste sludge produced in the blending stage through an agglomeration stage where it is mixed with a recycled portion of the dried end product to produce pellets, and continuously recycling at least a portion of the pellets through a moisture reduction stage to increase their solids content prior to their return to the agglomeration stage.

The process for treating partially dewatered sludge in accordance with the present invention includes introducing a predetermined amount of partially dewatered sludge into a mixer, adding a predetermined amount of alkaline material to the sludge within the mixer in a sufficient quantity to effect an exothermic reaction for heating the mixture to a predetermined temperature level and raising the pH level of the mixture. During the process of heating the material, water vapor is driven off. In addition, the alkaline material reduces odor by combining with malodorous compounds rendering them inactive and by raising the pH value to above 9, thus forcing ammonia out of solution. Ammonia can then be captured from the mixer air and sent back to the wastewater treatment plant or processed for use as a fertilizer supplement to the end-product. The mixture is then transferred from the mixer by a transferring means with the mixture being retained in the mixer and transferring means for a predetermined time period so as to provide a product having a predetermined alkalinity level which is void of pathogenic organisms. The mixture is then further transferred to an agglomerating device where a predetermined amount of dried end-product material is added to the mixture to promote agglomeration of the mixture to provide a pelletized product having a predetermined moisture content. Each particle of the dried end product material becomes a central nucleus around which the wetter newly produced sludge material is coated. As the pellets are recycled layers of wetter material are added and cured or dried. Once a pellet reaches a desired size it can be removed from the process by screening. The process further includes diverting at least a portion of the agglomerated material from the agglomerating device to a moisture reducing device for reducing the moisture content of the diverted material. At least a portion of the diverted material then being returned to the agglomerating device to be used to promote agglomeration therein, with the finished product then being withdrawn from the agglomerating device and/or the moisture reducing device. The aforementioned process is carried out by an apparatus for treating partially dewatered sludge in accordance with the present invention which includes a mixer for mixing materials supplied thereto, a first feed device for feeding a predetermined amount of partially dewatered sludge to the mixer and a second feed device for feeding a predetermined amount of alkaline material to the mixer for mixing with the sludge to produce a mixture having a predetermined alkalinity level and predetermined temperature for a predetermined period of time. The apparatus further includes an agglomeration device for agglomerating the mixture of the sludge and alkaline material and a transferring device for transferring the mixture from the mixer to an input of the agglomeration device. A discharge device is further provided for discharging the agglomerated product from an output of the agglomeration device with at least a portion of the agglomerated product being diverted to a moisture reduction device by a diverter for reducing the moisture content of at least a portion of the agglomerated product. Once the moisture content of the agglomerated product is reduced by the moisture reduction device, a recycling conveyor is provided for returning at least a portion of the diverted product to the agglomeration device for mixing with the mixture so that a final product is produced having a predetermined moisture content.

These as well as additional advantages of the present invention will become apparent from the following detailed description of the preferred embodiment with reference to the figures.

DETAILED DESCRIPTION OF THE PREFERRED EMBODIMENT

Figure 1:
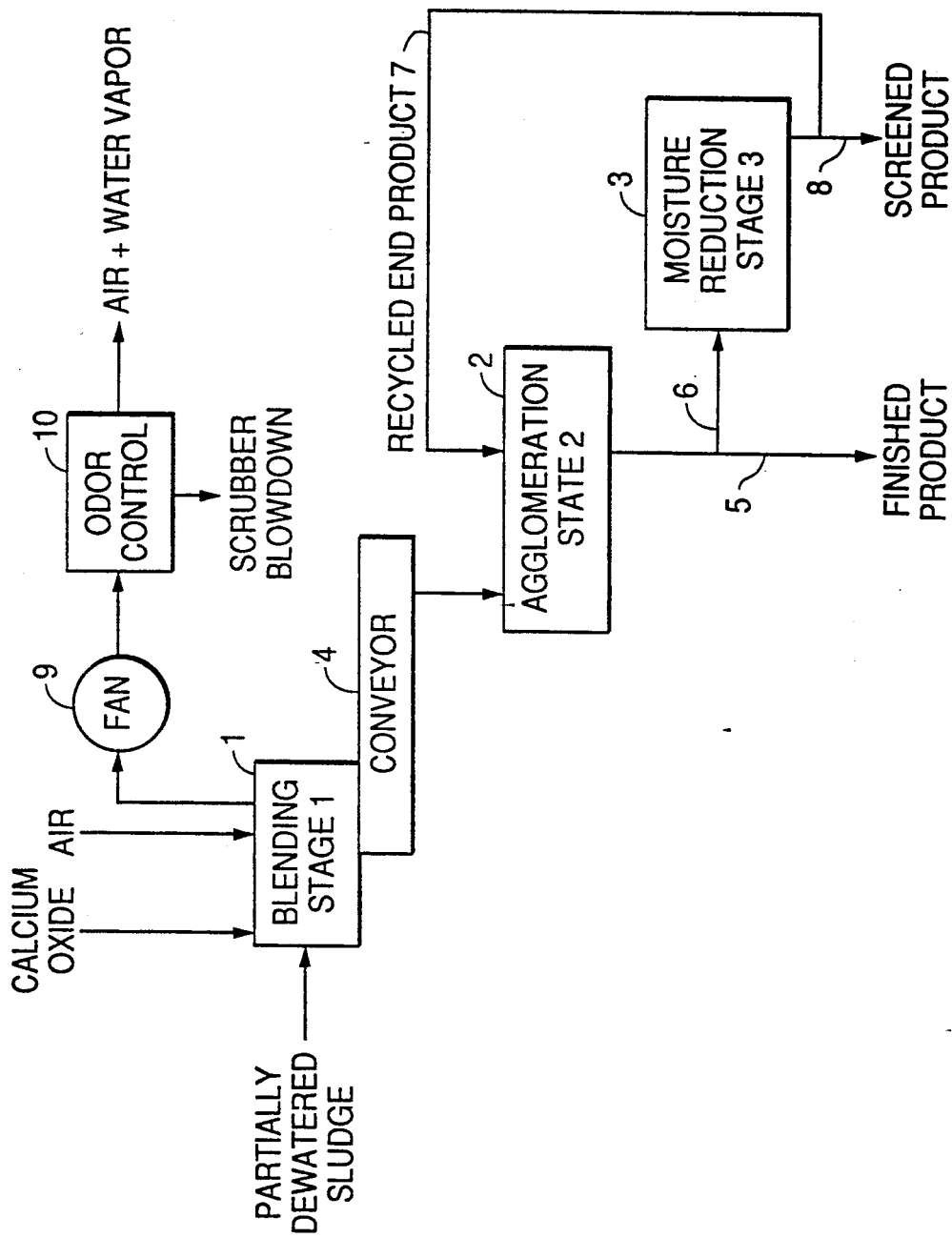
FIG. 1 is a flow diagram illustrating a process of producing a granular pathogenically stabilized sludge product in accordance with the present invention including screening and classification of the agglomerated product in the moisture reduction stage before the recycling of a portion of the material.

Referring to FIG. 1, a process of producing a granular pathogenically stabilized sludge product in accordance with the present invention includes feeding partially dewatered sludge cake by a variable speed feeding mechanism into a blending or mixing apparatus 1 where it is to be thoroughly mixed with an alkaline material. Alkaline material in the form of quicklime (calcium oxide) is either subsequently, simultaneously or previously fed through a variable speed feeding mechanism to the blending apparatus 1. While the alkaline material used in accordance with the present invention is preferably quicklime; calcium hydroxide, cement, lime, lime kiln dust, fly ash, pozzolanic materials or other calcium oxide containing material may be used. The rate of sludge feed and quicklime feed, along with the volume of the blender determine the amount of retention time in the blender. The drier the incoming sludge, the more retention time is required to insure each particle of calcium oxide comes in contact with water bound in the sludge to maximize the heat generated, thereby minimizing the amount of quicklime necessary for stabilization of the sludge. The rate of quicklime feed is determined by the water content of the sludge and the particular heat value required. Higher temperatures inactivate parasite ova quicker but use more quicklime. Lower temperatures require longer periods of time for inactivation. Generally, the pH stabilization requirements for sludges below 55 percent solids are met by the calcium oxide needed for the requisite heat generation.

In addition to raising pH and temperature, alkaline material will also affect the odor of the material. Calcium oxide will combine with or break down many odorous compounds. Increased pH also has an effect on odor: as the pH level goes above 8.9 pH ammonia is forced out of solution and into the air. Air from the mixer is drawn off during the mixing process through an odor control unit such as a scrubber or spray condenser 10 by means of a fan 9 in order to draw off the ammonia, other malodorous compounds and water vapor produced when the mixture is heated. This assists in drying the material. The ammonia may be precipitated with chemicals to produce fertilizer (e.g. using phosphoric acid to produce ammonium phosphate) which can be combined with the end product pellets to enhance their agricultural value, used as is as a fertilizing agent directly, or returned with the spray condenser water to the wastewater treatment plant for treatment.

In the present invention, it is preferred that the dewatered sludge be 10 to 60 percent solids by weight, that the temperature achieved within the blender be sufficient to inactivate parasite ova and not less than 60° C., that the amount of alkaline material be 10 to 150 percent of that of the partially dewatered sludge, and that the pH level attained during the process be in the range of 9 to 14, and preferably 12.

The sludge and quicklime mixture are then transferred continuously through and from the blender to a discharge receptacle in the form of a container or enclosed conveyor 4 where the total time spent in the blender and conveyor combination is equal to or slightly greater than the time required for parasite inactivation at the temperature produced in the mixture. This time being commensurate with the temperature of the mixture and not more than two hours. The container or conveyor 4 is typically a screw conveyor but can be any form of enclosed or partially enclosed container having an input and output for the purpose of retaining and conveying the mixture for a specified amount of time. Insulation of the blender and conveyor would aid in the retention of heat; however, the mixed sludge product tends to be self-insulating.

After the mixture has met pH, time and temperature requirements for pathogenic inactivation, it exits the conveyor 4 as a paste or wet clay-like material having a solids content in the range of 10-60% solids and preferably approximately 40 percent solids. The mixture is then discharged into an agglomeration stage 2. The agglomeration stage allows for further drying of the material without the addition of additional calcium oxide material; to form pellets from the mixture.

Most agglomerators either take a very dry product (80 percent solids or greater) and mix it with a liquid to form glomera, or start with a liquid and add powder. The agglomeration stage in accordance with the present invention process cuts dry material from the variable speed recycle conveyor 7 into the paste or clay-like material input by conveyor 4 in the agglomerator 2. The recycle material acts as dry nuclei and are coated with the wetter paste material. The dry material increases the percent solids and absorbs surface moisture, thereby preventing the pellets from adhering to each other. The preferred percent solids of the pellets leaving the agglomeration stage is more than 70 percent, though the process can produce pellets in a range from 50 to 80 percent solids. The solids content of the pellets exiting the agglomeration stage is regulated by the amount of recycled material mixed in with the blended material.

By separating this agglomeration step from the blending step none of the recycled material need be reheated as in prior sludge heating and pelletization processes and finished product can be taken off directly after agglomeration. More importantly, material other than relatively expensive quicklime can be used to further dry the mixture, thus lessening the overall operation costs. With previous processes, the inexpensive materials used to promote drying and crumbling of sludge based products are fly ash, bottom ash, lime kiln dust and cement kiln dust. However, such materials face numerous shortcomings. The four most significant problems with using these types of materials; are: One, since these materials are byproducts of a separate process, not the main product of such a process, their quality is not controlled and is free to vary; thus, characteristics important to sludge pelletization, such as moisture content can vary widely. Second, many of these combustion processes concentrate heavy metals in these waste products. In fact, a number of cement kilns around the country burn liquid hazardous waste as supplemental fuel. These pollutants would significantly limit the usefulness of the sludge based pellets in agricultural applications. Third, the use of these non-nutritive materials dilute the nutrient value of the end product, lessening its value in the agricultural market. And finally, these materials add to the overall process costs including transportation and storage costs.

In accordance with the present invention, it has been found that the least expensive material available for further drying the mixture is the end product itself. It has the added advantage of being non-polluting and non-diluting. Prior to the recirculation of a portion of the end product into the agglomeration stage, the moisture content of the product is reduced in a moisture reduction stage 3. Some or all of the finished pellets leaving the agglomeration stage 2 by a chute or conveyor 5 are diverted by a conveyor 6 into the moisture reduction stage 3.

In the moisture reduction stage 3 drying is accomplished in practice by any number of different methods. The simplest method of decreasing moisture content is by curing. In blending tests the maximum temperature attained occurs 3 to 15 minutes after the material exits the blender, indicating that hydration of calcium oxide is not instantaneous. Further tests have shown amounts of unreacted calcium oxide in granular material over one half hour old. By allowing more time for water to be absorbed in the hydration reaction the material will naturally become drier.

The amount of material to be recycled depends on: how dry it is, how much paste sludge is produced in the blending stage and at what dryness, and the desired dryness of the pellets exiting the agglomeration stage. The drier the recycle product, the less material is required for recycle. It is preferable for the recycle material to contain at least 20 percent more solids than the pellets exiting the agglomeration stage, though lesser amounts of dryness are possible.

Other methods of moisture reduction which could be used are: air drying, heat drying and screening, or combinations of these methods. FIG. 1 shows how air handling of the material through screening equipment can be used. As shown in FIG. 1, the moisture reduction stage 3 includes an additional output chute or conveyor 8. Since smaller particles have a larger surface to volume ratio, and since air handling would dry the surface, these particles would have a higher percent solids. The screening apparatus would separate these particles and recycle them through the recycle conveyor 7. The larger particles would be more uniform in size and dust free, a desirable characteristic for agricultural use. The screened pellets would exit the equipment through conveyor or chute 8 to a storage or transportation receptacle.

When screening the agglomerated product, the product is classified into essentially three classifications, acceptable size, those smaller than the acceptable size and those larger than the acceptable size. The acceptable size being predetermined in accordance with the intended use of the product. Once classified, smaller size products can be directly recycled to the agglomeration stage while the larger size product is first crumbled prior to being recycled. In addition, the smaller drier particles are particularly well suited for acting as dry nuclei for pellet formation in the agglomeration stage. Thus, as set forth hereinabove, by producing smaller particles which have a greater surface to volume ratio and greater exposure to air, the particles will include a higher percentage of solids, which are better suited for recycling.

The above descriptions and Figures are for purposes of illustration only and are not intended to be, and should not be construed as, limitations on the invention. In addition, one skilled in the art could suggest many changes or modifications, all of which are intended to be within the spirit and scope of the present invention as defined in the appended claims.

INDUSTRIAL APPLICABILITY

This process allows for more economical production of an agriculturally useful granular or pelletized product from sludges through the reduction of lime or similar alkaline materials. These materials constitute the largest single cost item in such processes. The process can be used for producing a pathogen-free, uniform durable granular end-product from sewage sludges or similar waste material.

What is claimed is:

1. A process for treating partially dewatered sludge, said process comprising the steps of: introducing an amount of partially dewatered sludge into a mixer; adding 10 to 150 percent by weight of alkaline material to the sludge within the mixer in sufficient quantity to effect an exothermic reaction for heating the mixture to a temperature level of at least 60° C. and raising the pH level of the mixture; transferring the mixture from said mixer to a discharge receptacle; retaining the mixture in the mixer and the discharge receptacle for a time period of not more than approximately 2 hours so as to provide a product void of pathogenic organisms; transferring the mixture from said discharge receptacle to an agglomerating means for agglomerating said mixture; adding an amount of dried end product material to said agglomerating means to promote agglomeration and provide a pelletized product with a solids content of between 50 and 80 percent; diverting at least a portion of the agglomerated material from the agglomerating means to a moisture reducing means; reducing the moisture content of the diverted material; recycling at least a portion of the diverted material dried in the moisture reducing means to the agglomerating means to be used to promote agglomeration; and withdrawing the finished product from at least one of the agglomerating means and the moisture reducing means.

2. The process as defined in claim 1, wherein the alkaline material is chosen from a group including calcium oxide, calcium hydroxide, cement, lime, lime kiln dust, fly ash, and pozzolanic materials.

3. The process as defined in claim 1, wherein the partially dewatered sludge is 10 to 60 percent solids by weight.

4. The process as defined in claim 1, wherein the predetermined alkalinity level is a pH level in the range of 9 to 14.

5. The process as defined in claim 4, wherein the predetermined alkalinity level is a pH level of 12.

6. The process as defined in claim 1, wherein the predetermined temperature level is based on time and temperature required for inactivation of parasite ova and is not less than 60° C.

7. The process as defined in claim 1, further comprising screening and classifying the diverted agglomerated dried product and recycling the portion of the agglomerated dried product not equal to a predetermined size.

8. The process as defined in claim 7, wherein agglomerated dried product of a size larger than said predetermined size is crumbled before being recycled to said agglomeration means.

9. An apparatus for treating partially dewatered sludge, said apparatus comprising:
a mixing means for mixing materials supplied thereto;
a first feed means for feeding a predetermined amount of partially dewatered sludge to said mixing means;
a second feed means for feeding a predetermined amount of alkaline material to said mixing means for mixing with the sludge to produce a mixture having a predetermined alkalinity level and predetermined temperature for a predetermined time period;
an agglomeration means for agglomerating the mixture of the sludge and alkaline material, said agglomeration means having an input and an output;
a transferring means for transferring said mixture from said mixing means to said input of said agglomeration means;
a discharge means for discharging the agglomerated product from said output of said agglomeration means;
a moisture reduction means for reducing the moisture content of at least a portion of the agglomerated product exiting said output;
a diverting means for diverting said portion of dried agglomerated product exiting said moisture reduction means; and
a recycling means for recycling at least a portion of the diverted product to said inlet of said agglomeration means for mixing with the mixture received from said mixing means so as to produce a final product having a predetermined moisture content.

10. The apparatus as defined in claim 9, further comprising a screening means for classifying by size dried agglomerated product exiting said moisture reduction means such that a portion of said dried agglomerated product is removed from said moisture reduction means and not recycled by said recycle means.

11. The apparatus as defined in claim 10, further comprising a crumbling means for crumbling the dried agglomerated product wherein the dried agglomerated product of a predetermined size is removed; the dried agglomerated product of a size smaller than said predetermined size is recycled to said agglomeration means by said recycling means; and the dried agglomerated product of a size larger than said predetermined size is crumbled by said crumbling means prior to being recycled to said agglomeration means by said recycling means.

* * * * *